United States Patent [19]

Kerman

[11] Patent Number: 4,749,354

[45] Date of Patent: Jun. 7, 1988

[54] INTERACTIVE AUDIO TEACHING AID

[76] Inventor: Edward Kerman, 9882 Century Dr., Ellicott City, Md. 21043

[21] Appl. No.: 57,023

[22] Filed: Jun. 3, 1987

[51] Int. Cl.$^4$ ........................................... G09B 50/004
[52] U.S. Cl. ................................... 434/321; 434/318; 369/32; 364/900
[58] Field of Search ................ 360/72.1, 72.2; 369/32; 364/900, 415, 521; 434/318, 321

[56] References Cited

U.S. PATENT DOCUMENTS 4,490,810 12/1984 Hon ...................................... 364/900

Primary Examiner—William M. Shoop, Jr.
Assistant Examiner—Brian Young
Attorney, Agent, or Firm—Morton J. Rosenberg

[57] ABSTRACT

An interactive compact disc system (10) having a teaching mode in addition to an entertainment mode is provided for the recovery of a predetermined aural response from predetermined randomly accessed storage on a compact digital disc. The interactive compact disc system (10) includes a mode select switch interface (26) which is coupled to microprocessor (22) by data bus (34) and address bus (32) for selecting the desired operational node. A keyboard (12) which includes a removable graphic overlay, provided for use in the teaching mode, is coupled to keyboard decoder/driver (14). Keyboard decoder/driver (14) generates a unique character code for each of the keyboard switches in keyboard (12). Microprocessor (22) uses that unique character code to generate an address for accessing the track encoder read only memory (24). Track encoder read only memory (24) provides a lock-up table which in effect cross references each keyboard key switch with a discrete audio segment on a compact digital disc located in disc playback unit (30).

17 Claims, 10 Drawing Sheets

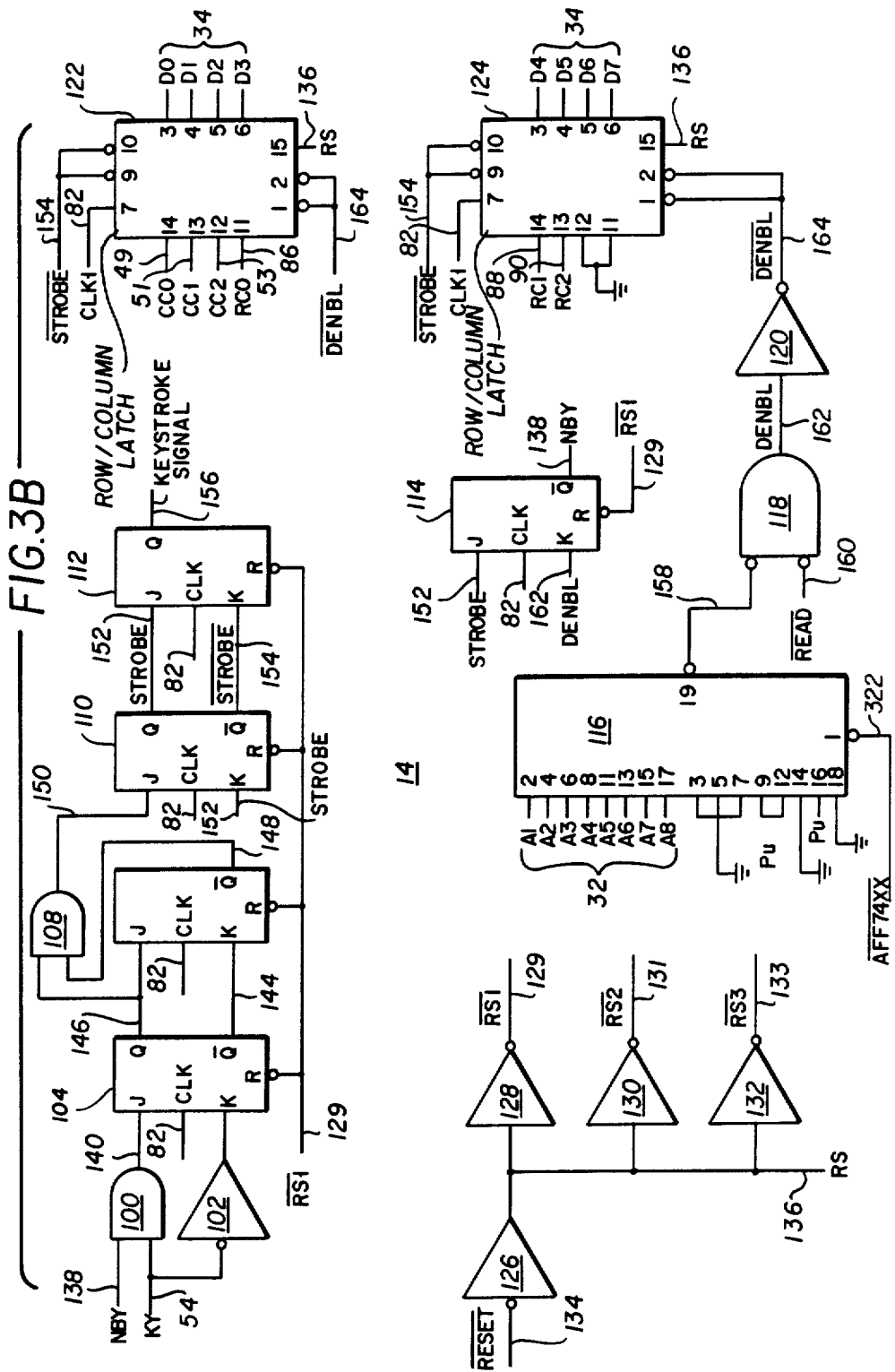

ADDITION TO EXISTING COMPACT
DISK PROGRAM

INTERRUPT SERVICE
ROUTINE

KEYBOARD SERVICE ROUTINE

INTERACTIVE AUDIO TEACHING AID

BACKGROUND OF THE INVENTION

1. Field of the Invention

This system pertains to compact digital disc systems. In particular, this invention directs itself to microprocessor controlled compact digital disc systems adapted for providing an interactive teaching operational mode in addition to an entertainment operational mode. More in particular, this invention pertains to a compact digital disc system where a keyboard is provided for interaction with the system during the teaching mode of operation. More in particular, this invention pertains to a compact digital disc system where the keyboard provided for use in the teaching mode includes a removable graphic overlay for referencing each of the keyboard keys to a specific lesson plan. Additionally, the subject invention relates to compact digital disc systems having keyboards for use in an interactive teaching mode where each keyboard switch relates to a unique character code which identifies a predetermined location in a look-up table. Still further, this invention relates to compact digital disc systems using a random access memory for the temporary storage of the unique character code generated in response to the operation of a keyboard switch. Further, this invention relates to a compact disc system utilizing a read only memory to provide a look-up table for cross referencing a unique character code generated in response to a keyboard switch operation to a predetermined aural response stored on a compact digital disc.

2. Prior Art

Compact digital disc systems which are directed to providing an audio output for entertainment purposes are known in the art. Additionally, audio teaching machines having keyboards with graphic overlays are also known in the art. However, such prior art audio teaching devices do not have the ability to randomly access a discrete previously stored variable length audio data in response to a particular keyboard entry. In addition, teaching devices do not generally store the audio output data in a format compatible with entertainment material and devices which utilize the same storage media. In opposition, the subject system is not limited to functioning as either an entertainment system or a teaching system, but functions as either operating mode. Thus, the subject invention has greater utilization as compared with those prior art systems and provides a cost effective means of providing both functions.

The best prior art known to Applicant includes U.S. Pat. Nos. 4,245,404; 3,913,443; 4,495,608; 3,724,100; 4,484,328; 4,380,438; 3,795,989; 3,996,671; 3,947,972; 4,001,947; 3,659,030; 3,648,385; 4,523,304; 4,552,535; 3,702,302; 3,689,930; 3,775,864; 4,464,124; 4,027,405; and, 3,886,671.

SUMMARY OF THE INVENTION

A microprocessor controlled compact disc system is adapted for providing both a teaching function and an entertainment function. Selection of either function is provided by means of a mode select switch. The output of the mode select switch is monitored by the microprocessor for determination of the selected operating mode. A keyboard is provided which is only functional in the teaching mode. The keyboard includes a removable graphic overlay used to relate a specific keyboard key with specific lesson material. Furthermore, each specific key is associated with a predetermined track location on the compact digital disc. The operation of each keyboard switch generates a unique character code used by the microprocessor to address a track encoder read only memory. The track encoder read only memory provides a look-up table which is accessed by the microprocessor using a memory address derived from the unique character code generated by the keyboard. The memory location addressed by the microprocessor contains a control code which is used to derive the control signals required to select a specific discrete audio segment from the compact digital disc.

BRIEF DESCRIPTION OF THE DRAWINGS

FIG. 3B is an electrical schematic diagram for the remaining portion of the keyboard decoder/driver shown in FIG. 1;

DESCRIPTION OF THE PREFERRED EMBODIMENTS

Figure 1:
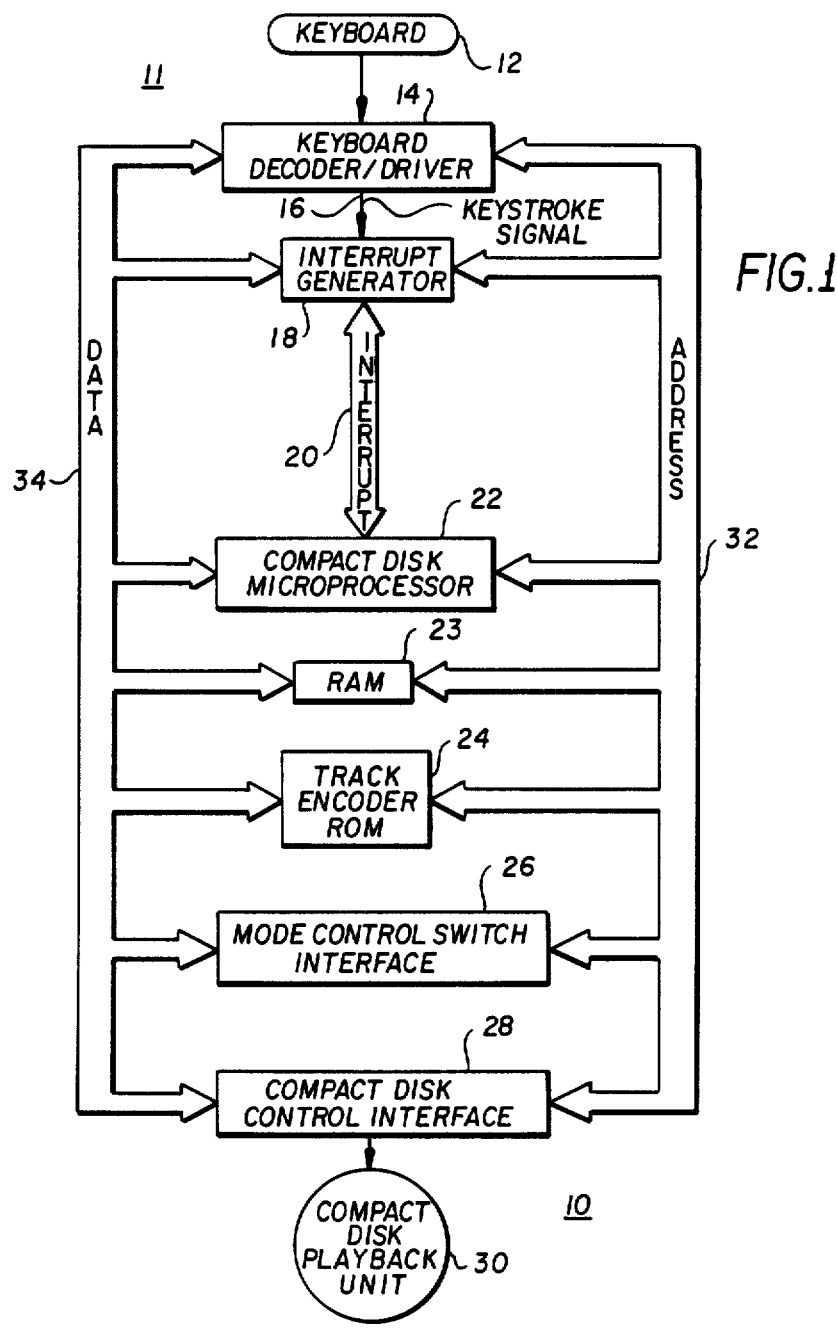
FIG. 1 is an overall block diagram of the interactive compact disc system.

Referring now to FIG. 1, there is shown an overall system block diagram of interactive audio teaching aid 10 for providing a verbal or audible response to enhance the quality of communications with a student, and particularly useful in the teaching of languages and musical concepts. In overall concept, interactive audio teaching aid 10 makes use of a compact disc and microprocessor technologies and integrates them to form an interactive user controlled aural instruction tool. Interactive teaching aid 10 expands the role of the standard microprocessor control system of an audio disc system to include the functions required for student interaction.

Interactive audio teaching aid 10 responds to a manual input entered through the user interface 11 to select and play a predetermined track of audio information, which has been pre-recorded on a compact disc. The user interface 11 includes keyboard or touch panel 12 for user entry of an input signal, and decoder/driver 14 for transmitting a digital word, representative of the input signal, to the compact disc microprocessor 22. User interface 11, further includes a graphic overlay, not shown, which is placed over the keyboard 12 to identify each key with respect to the particular lesson plan in use. Each lesson plan may include at least one written instruction manual, a graphic overlay, and a compact disc.

In still further overall concept, a student as directed by the instruction manual, depresses the appropriate key, as indicated by the graphic overlay, on keyboard 12 of user interface 11. A contact closure within keyboard 12 is converted to a digital word, for input to microprocessor 22, by decoder/driver 14. In addition, decoder/driver 14 generates a strobe signal on line 16 which is input to interrupt generator 18. Upon receipt of the keyboard strobe signal from line 16, interrupt generator 18 generates an interrupt priority level signal and an interrupt vector signal for input to microprocessor 22. Based on the interrupt priority level transmitted to microprocessor 22 from interrupt generator 18, as established by a predetermined interrupt hierachy, microprocessor 22 reads the interrupt vector to determine which device requires servicing. As it is the keyboard which has initiated the interrupt in this instance, the microprocessor enables an output from the keyboard decoder/driver 14 by means of a predetermined address signal sent out on the address bus 32. The keyboard decoder/driver 14, in response to being addressed by microprocessor 22, transmits a digital word to the data bus 34 which is representative of the particular key depressed by the user. The digital word transmitted from the decoder/driver 14 over data bus 34 is used by microprocessor 22 to generate the appropriate compact disc control instructions as defined in track encoder ROM 24. Thus, responsive to a particular key input from user interface 11, track encoder ROM 24 is addressed by microprocessor 22 for data used to generate the instructions to be transmitted to compact disc control interface 28. Having read the instruction code in track encoder ROM 24, microprocessor 22 addresses the compact disc control interface 28 and transmits the control instructions over data bus 34. The compact disc control interface 28 then responds by causing the compact disc playback unit to select a particular track of pre-recorded audio to be output to the user.

In this way, audio information pre-recorded on a compact disc can be output in a non-sequential fashion in response to a manually input control.

System 10 has the unique ability to function as a standard compact disc player system, as is well-known in the art, or alternately, as the interactive audio teaching aid as described in general concept above. System 10 determines which mode of operation is desired by checking the status of mode control switch interface 26. Upon initial start-up of system 10, microprocessor 22 addresses mode control switch interface 26 by means of address bus 32, and reads the status of data bus 34 for determination of the operating mode of system 10. The status of mode control switch interface 26 is checked recurrently by microprocessor 22 as directed by the resident programs executed by microprocessor 22. Thus, the logic block diagram of FIG. 1 defines an interface between a user of interactive audio teaching aid 10 and the compact disc player for selecting a particular track of audio information responsive to a user input.

Figure 2:
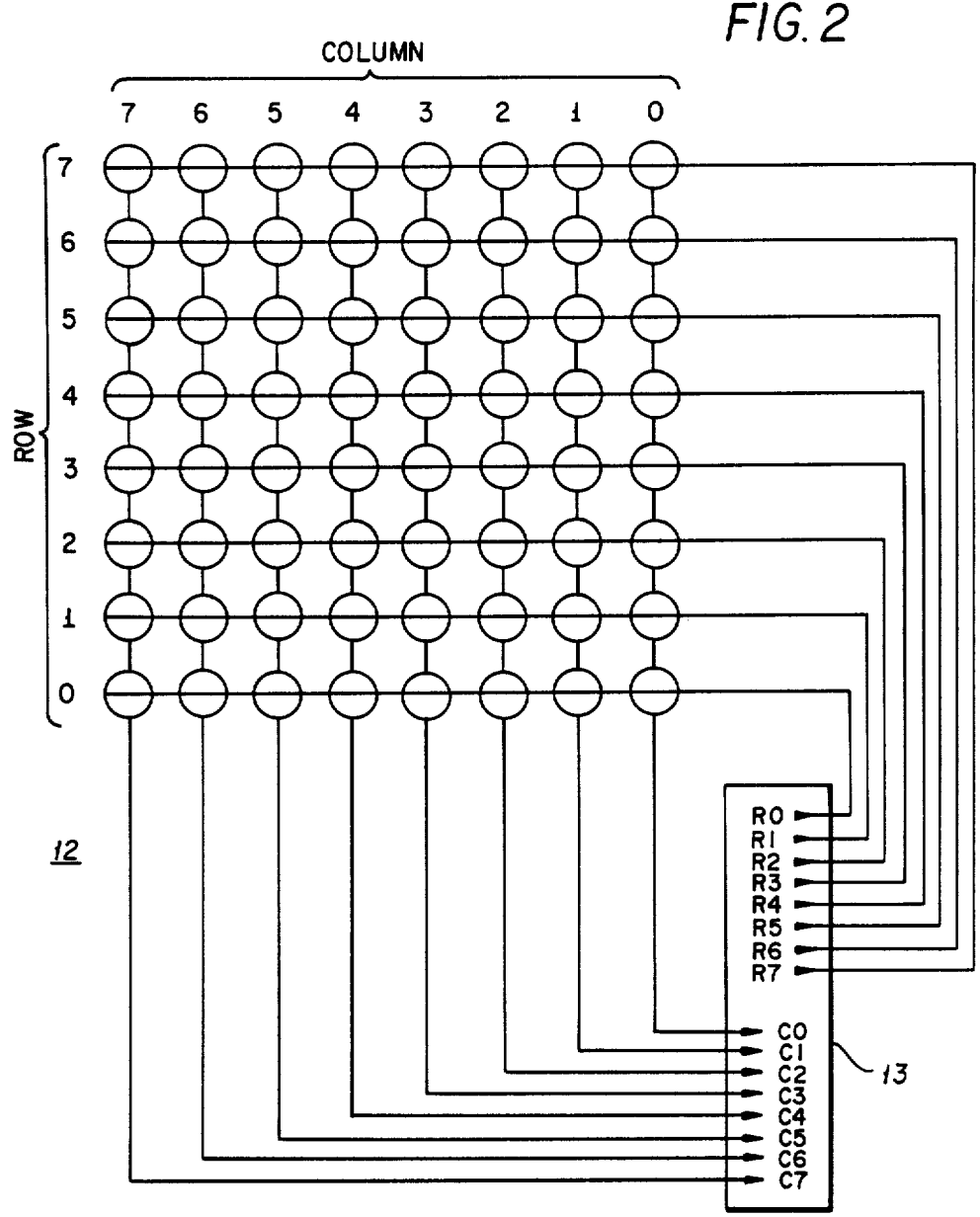
FIG. 2 is an electrical schematic diagram of the keyboard shown in FIG. 1.

Referring now to FIGS. 1 and 2, there is shown user interface 11 which is composed of a keyboard 12 to which a graphic overlay is attached, for integration of the keyboard with a particular lesson plan. The keyboard 12 may be any one from a large variety of commercially available keyboards. Such keyboards are usually encoded in either a matrix format or a direct output configuration. The direct output configured keyboards, have a separate output wire for each available key and while uncomplicated to decode, requires that a large number of wires and connections be made in order to implement the switch functions.

The matrix encoded units are usually arranged in a row/column configuration, where an input pulse is sequentially input to each of the row input leads, as an example. A corresponding output pulse on any of the column output leads would indicate a switch closure, and is identifiable by the timing of the pulse received and on which column output lead it was received. Therefore, the matrix encoded type keyboard is a more reliable and cost effective configuration, and is the type selected for use in the preferred embodiment to be described in following paragraphs. Referring now to FIG. 2, there is shown a matrix encoded sixty-four key keyboard. The switches are arranged in a standard matrix configuration where each switch is a two terminal device, with one terminal for each switch in a single row being commonly tied together by one of the respective row leads labeled R0-R7. The second lead or terminal of each switch is commonly tied together with that of each switch in a column by one of the respective column leads C0-C7. Thus, a switch closure at any point within the matrix couples a particular row lead to a particular column lead. As an example, if switch on row 7 column 4 were depressed, contact would be made between row line 7, R7, and column line 4, C4. Both the row and column leads are terminated in keyboard connector 13 for coupling to the keyboard decoder/driver 14.

As shown in FIG. 1, the keyboard decoder driver 14 of user interface 11 is a logic function designed to interface with the keyboard 12. Keyboard decoder/driver 14 provides the necessary sequential pulses to the input lines of keyboard 12, and decodes the keyboard output signal for the generation of a unique character code, or digital word, for each of the different keyboard keys. Keyboard decoder/driver 14 also provides a keystroke signal to indicate that a key has been depressed. The character code generated in response to the operation of a specific keyboard key is a digital word, or grouping of bits, which defines a specific address in the track encoder ROM 24.

The keystroke signal is a pulse which is output to interrupt generator 18 on output line 16 each time a key is depressed. The interrupt generator 18 monitors the keystroke signal, and generates a specific interrupt code on the microprocessor interrupt bus 20 whenever a key is depressed. For one preferred embodiment, where the microprocessor is a commercially available Motorola 68020 microprocessor, the interrupt generator outputs a three bit code to the interrupt bus 20. The three bit code indicates the priority level of the interrupt to the microprocessor, and is serviced along with other interrupts in a sequential fashion based on a predetermined hierachical order.

The logic of the interrupt generator 18 also produces an eight bit interrupt vector digital word for output on data bus 34. When microprocessor 32 services the interrupt transmitted by interrupt generator 18 on interrupt bus 20, the micro-processor strobes the address of the interrupt generator 18 in order to receive the interrupt vector on data bus 34. The interrupt vector is the address for the device requiring service by the microprocessor, in this case keyboard decoder/driver 14. Responsive to the interrupt vector, microprocessor 22 addresses the keyboard decoder/driver 14 to initiate the transmission of the unique character code on data bus 34.

Microprocessor 22 stores the character output by decoder/driver 14 in a predetermined location in random access memory 23 for use at a later time. Microprocessor 22 uses this unique character code to address the track encoder ROM 24 after having read and thus retrieved the character code from the predetermined RAM location in random access memory 23. The track encoder ROM 24 is a read only memory addressable by the microprocessor, and used to identify which compact disc track is to be played in response to the specific keyboard key operation initiated by the user.

As previously stated, keyboard decoder/driver 14 generates the digital word representation of the track encoder ROM address for each of the keys of keyboard 12. Since each key corresponds to a different compact disc track, each of the track encoder ROM addresses generated are unique. Track encoder ROM 24, in response to being addressed by microprocessor 22 with this unique character code representing a specific ROM address, outputs data used to form the instructions to be presented to the standard compact disc control interface 28, to cause playback of the intended disc track.

The mode control switch interface 26 is required to identify to the microprocessor a source for manual input control of the compact disc player. In the normal mode, the standard manual input controls on commercial compact disc players would be used to operate the device as found in the prior art. In the learning mode however, the keyboard 12 would be used to control the compact disc player operation. Since these functions are mutually exclusive, the mode control switch interface 26 disables those controls which are not required for the mode selected. In addition to disabling those functions not required, such as the keyboard in the normal mode, the mode control switch interface 26 provides mode status to the microprocessor 22. When mode control switch interface 26 is addressed by microprocessor 22, the data bits indicating the mode status are output to data bus 34 to indicate the mode selected by the user, thereby, directing what software routines the microprocessor should be running.

Figure 3A:
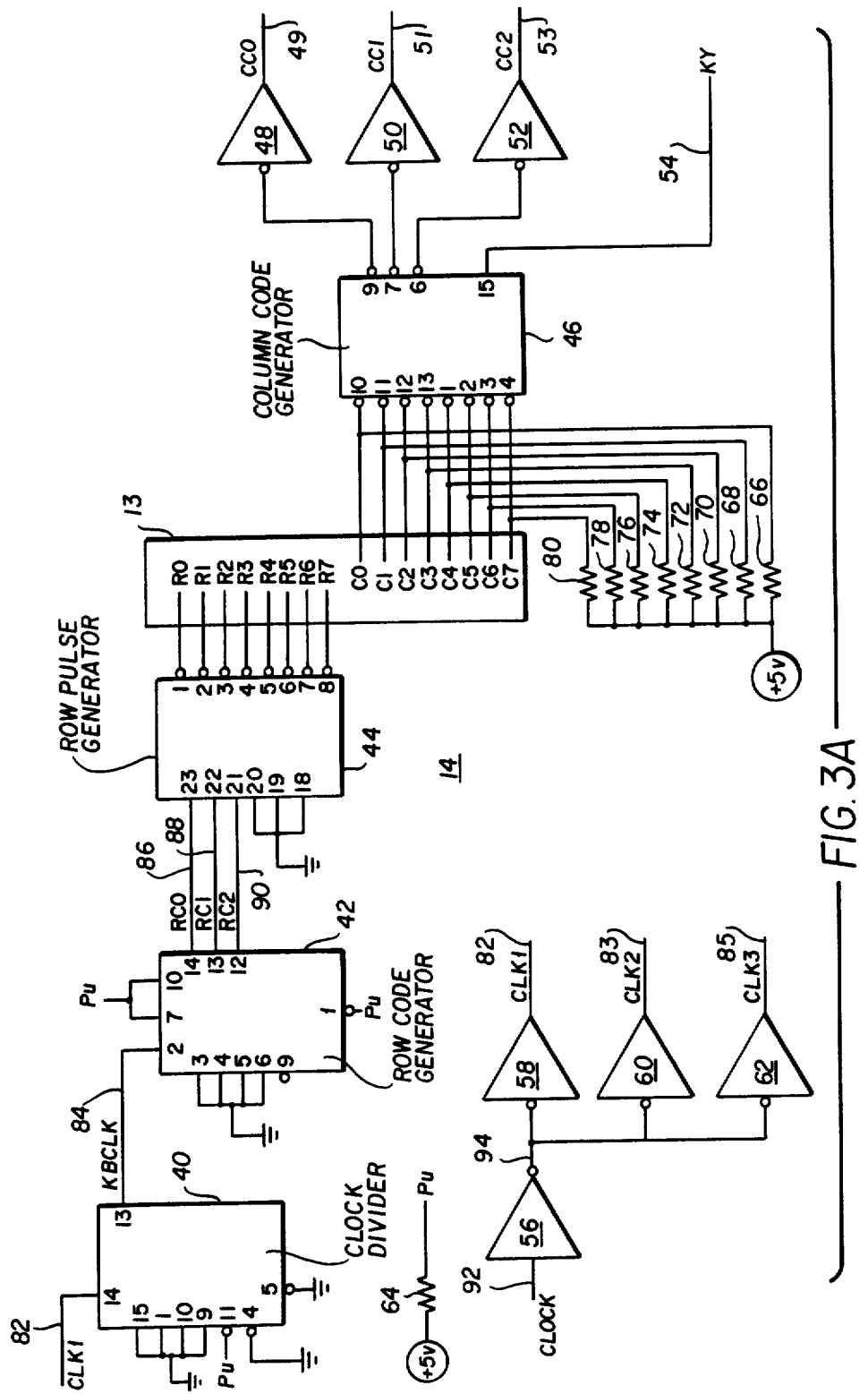
FIG. 3A is an electrical schematic diagram of a portion of the decoder/driver which interfaces with the keyboard shown in FIG. 2.

Referring now to FIGS. 3A and 3B, there is shown the logic schematic diagrams for decoder/driver 14, where the logic circuits required for the keyboard decoding is shown in FIG. 3A, and the logic circuitry required to generate the keystroke signal and unique character code are shown in FIG. 3B. As shown in FIG. 3A, the microprocessor clock signal on line 92 is input to amplifier inverter 56 which is coupled by line 94 to inverter amplifiers 58, 60 and 62. This inverter amplifier arrangement serves to buffer the clock signal input on line 92 providing clock signals on output lines 82, 83 and 85, respectively, which have the same polarity and frequency as the input clock signal and the capacity to drive a large number of additional logic devices. Inverter amplifiers 56, 58, 60 and 62 are part of an integrated circuit given the designation 7404, which is a commercially available TTL hex inverter device available from Texas Instruments, Inc., Dallas, Texas.

The clock signal which is used to drive the decoder/driver circuits shown in FIGS. 3A and 3B is output from inverter amplifier 58 to line 82 where it is coupled to clock divider 40. Clock divider 40 is a commercially available 74191 Up/Down Counter, TTL device available from Texas Instruments, Inc. Clock divider 40 divides the input clock signal by 16 for clocking of the keyboard row code generator 42. This keyboard clocking pulse is input to row code generator 42 on line 84.

Row code generator 42 is a commercially available 74163 4-bit counter available from Texas Instruments, Inc.

Since keyboard 12 has eight rows of switches, only a three bit code is required to sequentially pulse each row. The three bit code which is generated by row code generator 42 is output on lines 86, 88 and 90, respectively. Lines 86, 88, and 90 input the three bit code into row pulse generator 44, which decodes the three bit input from row code generator 42 to generate a pulse on a single row line designated R0–R7. Row pulse generator 44 is a commercially available 74159 4 to 16 line decoder, available from Texas Instruments, Inc.

Thus, it can be seen that a three bit count is generated by row code generator responsive to the divided microprocessor clock signal. The three bit binary count in turn is used to sequentially pulse keyboard row lines R0–R7 by row pulse generator 44. Keyboard row lines R0–R7 terminate at keyboard cable connector 13 for coupling to keyboard 12.

When a keyboard switch is closed causing a row line to be coupled to a column line, the pulse transmitted by row pulse generator on the designated row line will return on the coupled column line for encoding by column code generator 46. Each of the column keyboard column lines are terminated at keyboard cable connector 13 and are each coupled to an input of column code generator 46. Column code generator 46 is a commercially available 74148 8 to 3 line encoder available from Texas Instruments, Inc. Column code generator 46 generates a three bit binary code responsive to the particular column line input having the row pulse thereon.

Column code generator 46 also generates a key strobe signal whenever a row pulse is received on any of the keyboard column lines C0–C7, and is used to generate the keystroke strobe signal for input to interrupt generator 18 as will be described in following paragraphs. As required for proper operation of column code generator 46, each of the input lines C0–C7 must be tied to appropriate pull-up resistors 66–80 which are each in turn coupled to the positive five volt supply source for system 10.

A number of the logic circuits used in system 10 require pull-up inputs hereinafter designated by the letters PU. The pull-up circuit consists of a pull-up resistor 64 coupled in series relation between the device input and the positive five-volt power supply source for system 10 as shown in the Figure.

Referring now to the remaining circuitry of decoder/driver 14 shown in FIG. 3B, the microprocessor reset signal is handled in the same fashion as was previously described for the clock signal. The reset signal from the microprocessor is input to inverter amplifier 126 by line 134, whose output is coupled to inverter amplifiers 128, 130 and 132 by line 136. The reset signal to be used by the decoder/driver circuitry is output from inverter amplifier 128 on line 127. Inverter amplifiers 126, 128, 130 and 132 are a commercially available hex inverter designated as 7404, available from Texas Instruments, Inc.

The keystroke signal output from column code generator 46 on line 54 responsive to the operation of a keyboard switch, is input to AND gate 100 and in parallel relation, inverter amplifier 102. AND gate 100 logically ands the key stroke signal on line 54 with a not busy signal input on line 138, whose derivation will be described in following paragraphs. The output of AND gate 100 is input on line 140 to the J input of JK flip-flop 104, while the inverted keyboard strobe signal output from inverter amplifier 102 on line 142 is coupled to the K input of JK flip-flop 104. Both the inverting and non-inverting outputs of JK flip-flop 104 are coupled to JK flip-flop 106. The non-inverting output of flip-flop 104 is coupled by line 146 to the J input of flip-flop 106, and the inverting output of flip-flop 104 is coupled by line 144 to the K input of flip-flop 106.

The inverting output of flip-flop 106 is logically anded with the non-inverting output of flip-flop 104 in AND gate 108 to generate a resync signal on line 150 coupled to the J input of JK flip-flop 110 which serves as a control signal causing the row/column latch 122 and 124 to latch data (indicating which keyboard key was depressed). This occurs since the inverting output 154 of flip flop 110 conditions row/column latch to strobe and latch such data. The non-inverting output of JK flip-flop 110 is output on line 152 for coupling to JK flip-flop 112 and the K input of flip-flop 110, thus providing feedback to flip-flop 110 to reset itself, so that it remains set for only one clock period. The non-inverting output of JK flip-flop 112 provides the keystroke signal on line 156 which is coupled to interrupt generator 18.

Each of the JK flip-flops 104, 106, 110, and 112 are clocked by the buffered microprocessor clock on line 82. Each of the flip-flops are respectively tied to reset line 129 to clear each device when a master reset signal is received from the microprocessor.

JK flip-flop 114 is included as part of decoder/driver circuitry for generation of a keyboard cycle-busy signal which is transmitted from the inverted output of JK flip-flop 114 on line 138 to AND gate 100 as previously described. The strobe signal generated by flip flop 110 and output on line 152 is coupled to the J input of the keyboard cycle-busy flip-flop 114, such indicates that a key has been depressed. The K input of keyboard cycle busy flip-flop 114 is provided by the decoder enable signal, whose generation will be described in following paragraphs. Flip-flop 114 is clocked by the buffered microprocessor clock signal transmitted on line 82, and reset by the buffered master reset signal on line 129, as is the case for flip-flops 104, 106, 110 and 112. JK flip-flops 104, 106, 110, 112, and 114 are all commercially available 74107 JK flip-flops available from Texas Instruments, Inc.

Figure 6:
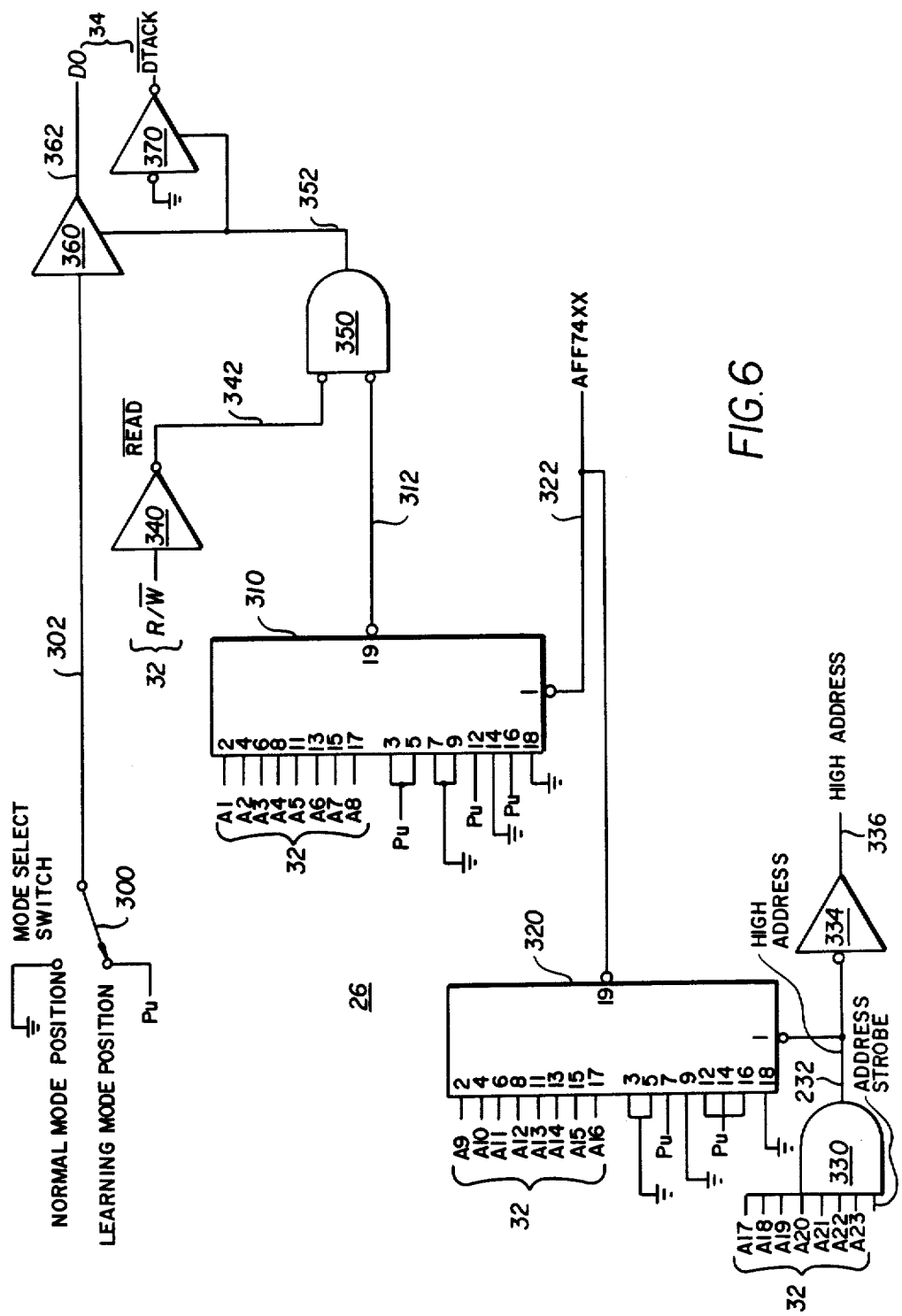
FIG. 6 is an electrical schematic diagram of the mode control switch interface shown in FIG. 1.

The keyboard cycle-busy signal generation just described, provides a means for inhibiting subsequent keyboard inputs until the current keyboard signal is processed and transmitted to the microprocessor. As is shown in the Figure, comparator 116 monitors the microprocessor address bus 32 for determining when the microprocessor requires output of the unique character code generated by decoder/driver 14. The output of comparator 116 is enabled by the high address enable signal on line 322, generated by comparator 320, as shown in FIG. 6. The comparator-enabled signal output on line 158, which is "true" when the eight bit code of the low order bits on address bus 32 matches that which has been predetermined for decoder/driver 14, is logically anded with the microprocessor read-enabled signal on line 160 in NOR gate 118. The decoder-enabled signal output from NOR gate 118 on line 162 is inverted by inverter amplifier 120 for input on line 164 to row/column latches 122 and 124. NOR gate 118 is commercially available 7402 TTL device available from Texas Instruments, Inc., and comparator 116 is a commercially available 74F521 eight bit comparator available from Fairchild Industries, Inc.

The row column latches 122 and 124 make up the unique character code which identifies a particular switch on keyboard 12 and used by microprocessor 22 to address track encoder ROM 24. Row/column latches 122 and 124 are commercially available four-bit registers having the designation 74173, and are available from Texas Instruments, Inc. Row/column latch 122 generates the four low order bits of the unique eight bit character code, while row/column latch 124 generates the upper four data bits of the eight bit unique character code.

As shown in FIG. 3A, the three bit output of column code generator 46 is inverted by inverter amplifiers 48, 50 and 52, respectively, in order to provide the column code signals for coupling to row/column latch 122 on lines 49, 51 and 53, respectively. Also, input to row/column latch 122 is the row code line 56, used as the fourth bit of the four bit input code. The remaining two row code signals on lines 88 and 90 are input to row/column latch 124 for output as part of the upper four bits of the eight bit unique character code. The remaining two bits of the four bit input for row/column latch 124 are held to a zero value as they are not used.

Row/column latches 122 and 124 are clocked by the buffered clock signal on line 82. They latch both the column and row signals which appear on their input in response to the inverted strobe signal on line 154. The unique character code created by the pulse on the row and column lines when a switch closure occurs is output to the data bus 34 by latches 122 and 124, when the enable signal input on line 164 is generated by the appropriate comparator output on line 158 and the microprocessor read signal on line 160. Thus, describes the generation of unique character code by decoder/driver 14 in response to a switch closure in keyboard 12 initiated by a user of system 10.

Figure 4:
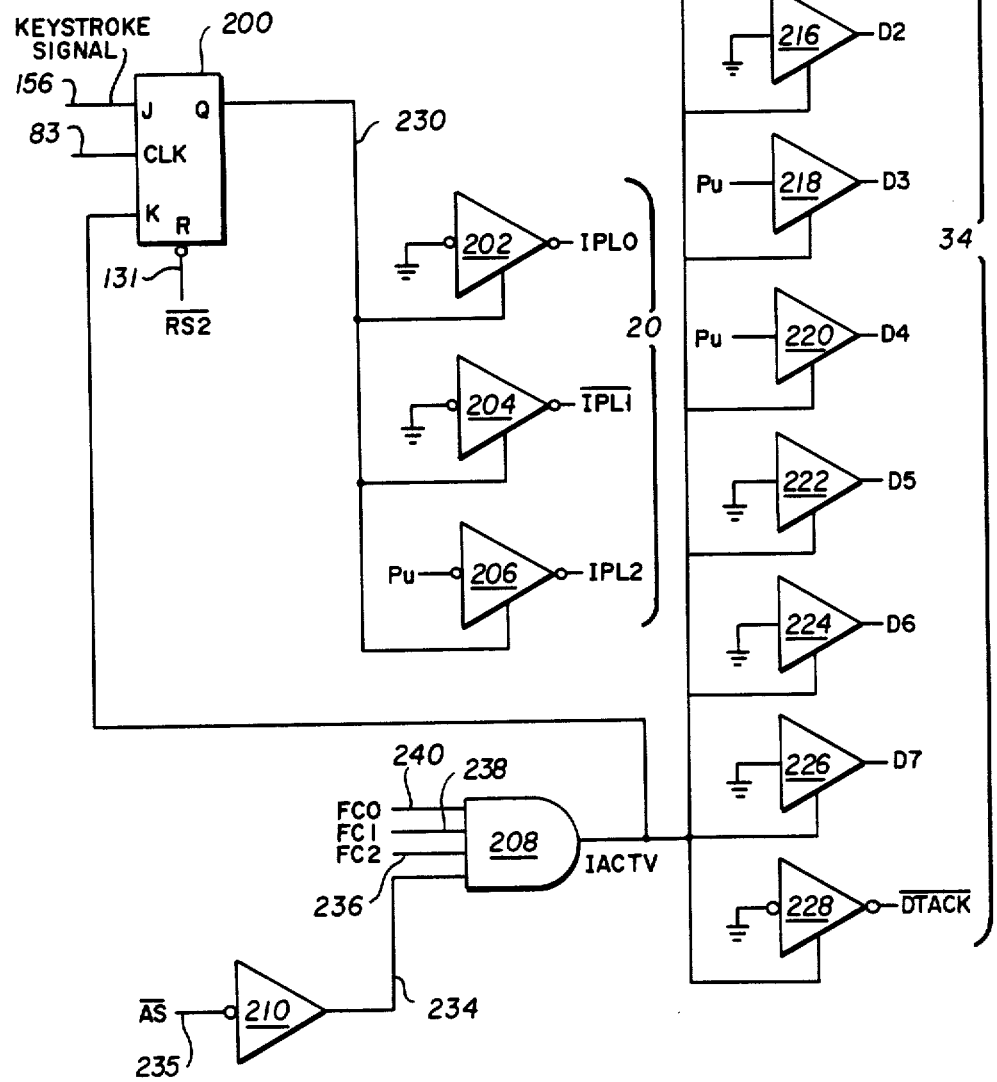
FIG. 4 is an electrical schematic diagram of the interrupt generator shown in FIG. 1.

Referring now to FIG. 4, there is shown the logic schematic diagram for interrupt generator 18. The latched keystroke signal output from decoder/driver 14 on line 156 is coupled to the input of JK flip-flop 200 of interrupt generator 18. Flip-flop 200 is clocked by a buffered clock pulse whose origination is shown in FIG. 3A and previously described. The clocked pulse on line 83 is coupled to the clock input of flip-flop 200. Likewise, the buffered reset signal on line 131, whose origination is shown in FIG. 3B and was previously described, is coupled to the reset input of flip-flop 200. JK flip-flop 200 is a commercially available TTL flip-flop having the designation 74107 and available from Texas Instruments, Inc.

The K input of flip-flop 200 is an interrupt activity signal coupled from AND gate 208 by line 232. To generate the interrupt activity signal, gate 208 logically ANDs the three function code bits FC0, FC1 and FC2 supplied on lines 240, 238, and 236, respectively, with the address strobe output from inverter amplifier 210 on line 234. The function code signals FC0, FC1, and FC2 input to gate 208 and the address strobe input to inverter amplifier 210 on line 235, are microprocessor outputs transmitted on separate output lines directly from microprocessor 22. Inverter amplifier 210 is a commercially available TTL hex inverter having a designation 7404, and gate 208 is a commercially available four input AND gate having a designation 7421, both available from Texas Instruments, Inc.

The output of flip-flop 200 is coupled to bus buffer gates 202, 204, and 206 by line 230. Thus, the output from flip-flop 200 causes the transmission of the interrupt priority level signal to be transmitted from gates 202, 204, and 206 on lines 20A, 20B, and 20C respectively to microprocessor 22 on interrupt bus 20. For one operating embodiment where a Motorola MC68000 series microprocessor is used, the priority level signal is sent as a priority level 3, such that the logic level on lines 20A and 20B is a zero while the logic level on line 20C is a logic 1.

The generation of the priority level 3 signal transmitted to microprocessor 22 is accomplished by coupling the inputs of buffer gates 202 and 204 to the system power supply reference, while coupling the input to gate 206 to a pull-up circuit as is shown in FIG. 3A and previously described.

The interrupt activity signal on line 232 responsive to the address strobe from microprocessor 22 causes the flip-flop 200 to change states, thus terminating the output of the priority level signal, and enables the output of the interrupt vector to data bus 34. The interrupt vector is output from nine buffer gates 212, 214, 216, 218, 220, 222, 224, 226, and 228 to data bus 34 responsive to the interrupt activity signal on line 232 which is coupled to the enabling input of each of the gates. Since, the interrupt vector is a predetermined code, the input to buffer gates 218 and 220 are by means of the previously described pull-up circuit, while the remaining gates have inputs coupled to the power supply reference (logic zero). Buffer gates 202, 204, 206, 212, 214, 216, 218, 220, 222, 224, 226, and 228 are all commercially available Tristate Quad Bus Buffer gates available from Texas Instruments, Inc.

Thus, as shown in FIG. 4, interrupt generator 18 generates a priority level 3 signal responsive to an input keystroke signal for input to microprocessor 22 on interrupt bus 20. Microprocessor 22 acknowledges receipt of the interrupt signal by transmitting the function code and address strobe for the clearing of the interrupt signal and the enabling of the transmission of the interrupt vector digital word. The interrupt vector is a predetermined coded message to microprocessor 22 indicating the source of the interrupt.

Figure 5:
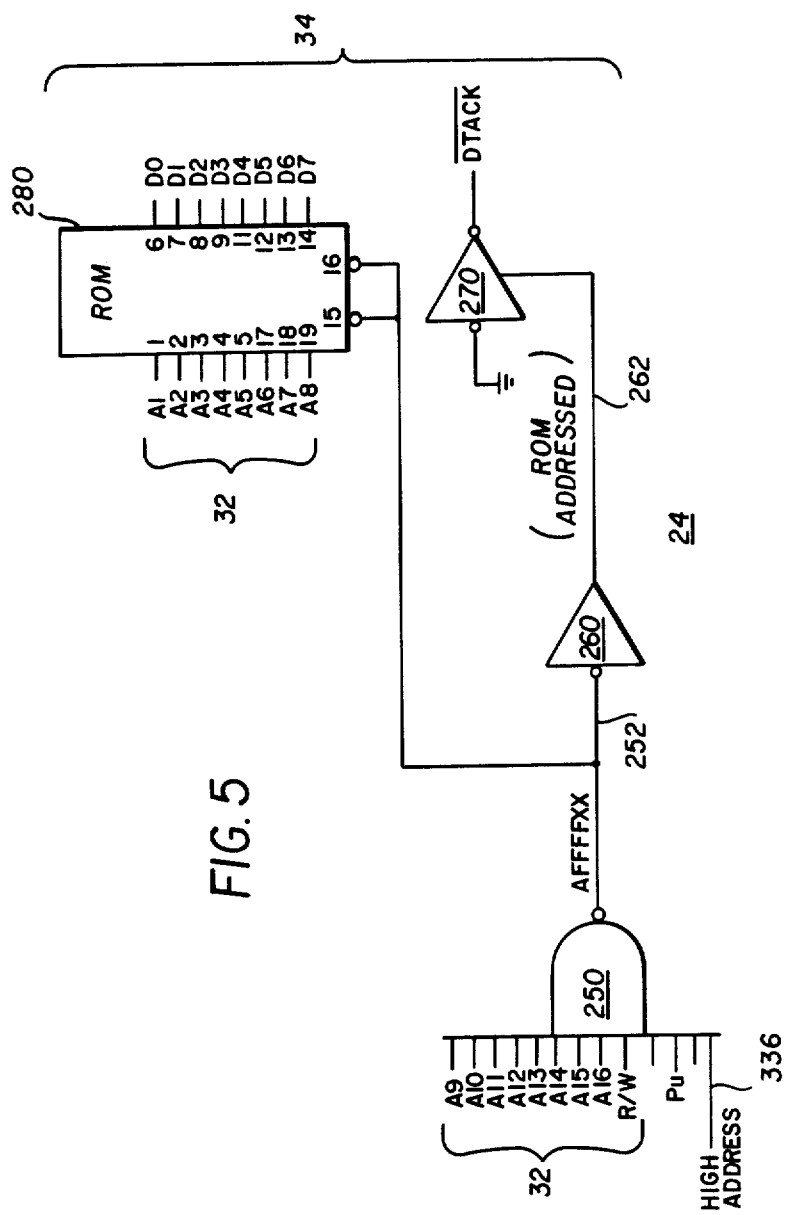
FIG. 5 is an electrical schematic diagram of the track encoder read only memory shown in FIG. 1.

Referring now to FIG. 5, there is shown the logic circuitry for track encoder ROM 24. Track encoder ROM circuitry 24 includes a read only memory device 280 whose input is an eight-bit address derived from the low order eight bits of the microprocessor address bus 32, A1 through A8. Although the embodiment herein described utilizes a read only memory device, any non-volatile memory configuration, such as a battery backed-up random access memory or an electrically programmable read only memory, could be used. The addressed location in ROM 280 is read in response to a signal on line 252 which is output from NAND gate 250. This enabling signal on line 252 is a logic zero signal generated by NAND gate 250 when all of the inputs to gate 25 are logic level 1.

The inputs to gate 250 comprise the address bits from address bus 32, A9 through A16, the "high address" indicator 336 from inverter amplifier 334, shown in FIG. 6, and the read signal from microprocessor 22 also available from the address bus 32. The unused inputs of gate 250 are coupled to the previously described pull-up circuitry shown in FIG. 3A. The read only memory 280 in response to the enabling signal received on line 250 and the address bits input on lines A1 through A8 of address bus 32, reads the appropriate memory location, and subsequently outputs the data bits stored therein on data lines D0 through D7 for output on microprocessor data bus 34, along with a data transmit acknowledge signal generated by buffer gate 270.

The data transmit acknowledge signal is a low level logic signal and therefore, the input to buffer gate 270 is coupled to the power supply reference. The data transmit acknowledge signal is enabled by the same enabling signal transmitted to read only memory 280 on line 252, but its logic level must be inverted. Therefore, line 252 is coupled to the input of inverter amplifier 260 for output of the inverted enabling signal on line 262 to the enabling input of buffer gate 270. Gate 250 is a commercially available thirteen input NAND gate having the designation 74S133 available from Texas Instruments, Inc. Inverter amplifier 260 is a TTL hex inverter having the designation 7404, and buffer gate 270 is a commercially available Tristate Quad Buffer Gate, having the designation S74126 both available from Texas Instruments, Inc. Read only memory 280 is a commercially available 256 bit by eight bit read only memory available from Texas Instruments, Inc., and having the designation 38522.

Referring now to FIG. 6, there is shown the logic schematic diagram for the mode control switch interface 26. The manually operated single pole double throw mode select switch 300 inputs a logic level signal representative of the desired operating mode for system 10 to microprocessor 22. Buffer gate 360 receives the logic level signal from switch 300 for transmission to microprocessor data bus 34 when microprocessor 22 addresses control switch interface 26, as will be described in following paragraphs.

The normal compact disc operating mode is represented by a logic zero and thus, that corresponding pole of switch 300 is coupled to the power supply reference. The interactive audio teaching mode however, is represented by a logic level one and therefore, the corresponding pole of the switch 300 is coupled to a pull-up circuit, as previously described and shown in FIG. 3A. The mode control switch interface 26 is addressed by microprocessor 22 with a 16-bit address decoded by comparators 310 and 320. Comparator 310 compares the lowest order address bits A1 through A8 received from address bus 32 with the predetermined code defined by the power supply reference and pull-up inputs appropriately coupled to the compare inputs of comparator 310. Comparator 320 decodes the next eight higher order address bits A9 through A16 coupled to comparator 320 from address bus 32. Comparator 320 similarly compares the address bits A9 through A16 with a predetermined bit code defined by pull-up and power supply references coupled to the compare inputs of comparator 320.

Comparators 310 and 320 are cascaded by coupling the output of comparator 320 to the compare-enable input of comparator 310 by line 322. Comparator 320 is enabled upon receipt of a high address enabling signal generated by NAND gate 330 and transmitted to comparator 320 line on 332. The high address enable signal is the inverted product of logically anding the highest order address bits A17 through A23 with the address strobe, all transmitted from microprocessor 22 on address bus 32. NAND gate 330 is a commercially available eight input NAND gate having the designation 7430, available from Texas Instruments, Inc. Comparators 310 and 320 are commercially available eight bit comparators having the designation 74F521, available from Fairchild Industries, Inc. The high address enabling signal is also input to inverter amplifier 334 by line 332. Inverter amplifier 334 inverts the high address signal for input to gate 250, shown in FIG. 5, on line 336.

When mode control switch interface 26 is properly addressed, such that the comparisons in comparator 310 and 320 are true, the output of comparator 310 on line 312 will be a logic level zero signal used to generate the data transmit-enable signal. The data transmit-enable signal is output from gate 350 on line 352 responsive to the logical anding of the inverted logic signals output from comparator 310 on line 312 and the inverted read signal output from inverter amplifier 340 on line 342.

The read signal transmitted from microprocessor 22 on address bus 32 is input to inverter amplifier 340 for inversion of the logic level required for proper generation of the data transmit enable signal as generated by gate 350. The data transmit-enable signal on line 352 is coupled to bus buffer gates 360 and 370 for transmission of the mode status data to data bus 34. Bus buffer gate 360 transmits the mode status as defined by switch 300 which is coupled to gate 360 by line 302, for transmission of the status logic level on line 362, representing the lowest order data bit for input to microprocessor 22. Bus buffer gate 370 transmits the data transmission-acknowledge signal to microprocessor 22 on data bus 34 by transmitting a logic level zero signal.

Therefore, the input of bus buffer gate 370 is tied to the power supply reference to provide the logic level zero signal. Bus buffer gates 360 and 370 are commercially available Tristate Quad Bus Buffer Gates having the designation 74126, and available from Texas Instruments, Inc. Gate 350 is a commercially available two input NOR gate having the designation 7402 and available from Texas Instruments, Inc. Inverter amplifiers 334 and 340 are commercially available TTL inverters having the designation 7404 and available from Texas Instruments, Inc.

Thus has been described the method by which microprocessor 22 determines the status of mode select switch 300 by addressing mode control switch interface 26 and reading the lowest order data bit from data bus 34.

Figure 7:
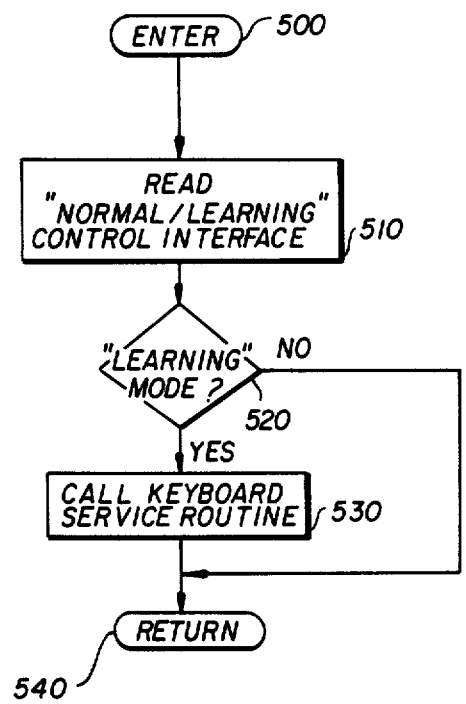
FIG. 7 is a logic flow diagram of the mode control interface sub-routine.

Referring now to FIG. 7, there is shown a flow diagram for a sub-routine which is added to the standard compact disc microprocessor control program. This sub-routine is inserted into the normal control program for a compact disc microprocessor at a point where it will be frequently executed. Execution of the sub-routine is started at entry block 500 and then control is passed to block 510 where the status of mode control interface 26 is read as has previously been described. The status signal is passed to decision block 520 where it is tested to determine the mode of operation for system 10. If the interactive teaching mode has been selected, the sub-routine branches to block 530 where the keyboard service routine is executed. If the normal compact disc mode has been selected, the sub-routine branches to block 540 where control is passed back to the main compact disc control program.

Figure 8:
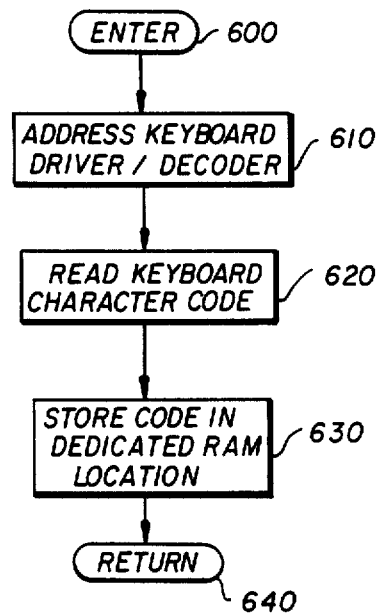
FIG. 8 is a logic flow diagram of the interrupt service sub-routine.

Referring now to FIG. 8, there is shown a flow diagram for the interrupt service routine. The interrupt service routine module is run by microprocessor 22 whenever the interrupt generator 18 produces an interrupt of priority level 3, at entry block 600. The flow passes from entry block 600 to block 610, where the interrupt service routine addresses the keyboard decoder/driver 14. The flow is then passed to block 620, where the data bus 34 is read to obtain the unique character code representative of a track encoder ROM address output from keyboard decoder/driver 14. This code is passed to block 630 where it is stored in a predetermined and dedicated location in the existing microprocessor random access memory 23, so that it can be retrieved when required by the keyboard service routine. It is required that the unique code for any key must have a value other than zero, and that this dedicated random access memory location be cleared to a zero value by microprocessor initialization and reset to a zero value after a valid character code is read. Thus, a value of zero in the dedicated memory location will indicate that no compact disc control activity is required, while a non-zero value will indicate that a specific selected track needs to be played. Following storage of the character code, the flow passed to return block 640 which passes control back to whatever soft routine was running at the time the interrupt was serviced.

Figure 9:
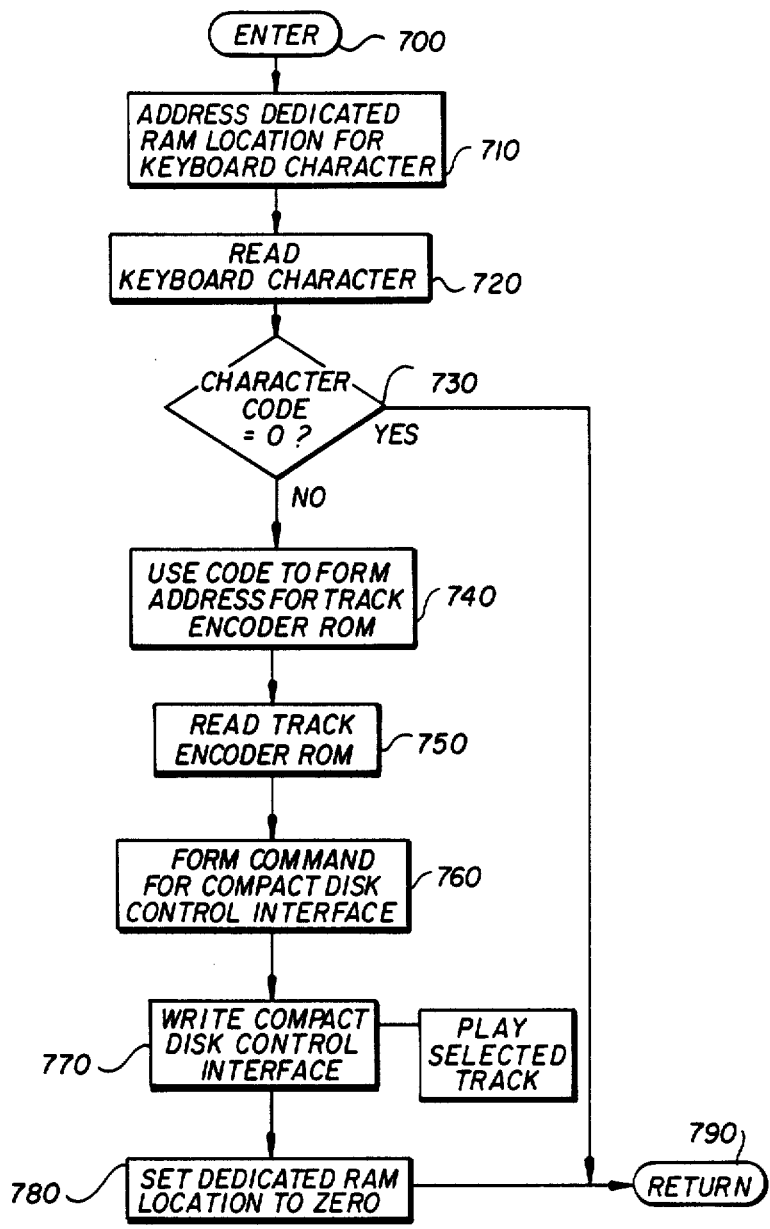
FIG. 9 is a logic flow diagram of the keyboard service sub-routine.

Referring now to FIG. 9, there is shown a flow diagram for the keyboard service routine which starts at entry block 700. From entry block 700 the flow passes to block 710 where it reads the dedicated location in random access memory 23 where a keyboard character would be stored code. The character code read is passed to decision block 730 which tests for a character code equal to zero. If the character code is equal to zero, such indicates that a keyboard key has not been depressed and control is passed to block 790 which returns control to the routine from which the keyboard service routine was called. If however, the character code is non-zero, then such is passed to block 740 where it is used to form the address for track encoder ROM 24. The track encoder ROM provides a look-up table to associate a particular keyboard key with a particular compact disc track to be played. After using the character code to form the track encoder ROM address in block 740, the address is passed to block 750 where a read instruction is issued to the track encoder ROM 24. The code read from track encoder ROM 24 is passed to block 760 where a control command is thusly formed from the track encoder ROM output. The control command is passed to block 770 where it is transmitted to the compact disc control interface 28 in order to select and play the associated compact disc track. The flow then passed to block 780 where the dedicated random access memory location in which the keyboard character code was stored is reset to a zero value. Following this step, the flow passed to block 790 where control is then transferred back to the calling routine for the continuation of normal processing by microprocessor 22.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A microprocessor controlled compact digital disk system adapted for providing both a teaching function and an entertainment function, said entertainment function making use of a plurality of compact disk control switches, comprising:
   (a) keyboard means for establishing a selection code signal to recover audio data from discrete predetermined locations on said compact digital disk responsive to a manual input, said keyboard means establishing said selection code when said teaching function is enabled;
   (b) mode selection means for directing said microprocessor to enable one of said teaching or entertainment functions, said mode selection means including (1) a mode select switch having two positions, and (2) a mode select interface coupled to said mode select switch and said microprocessor for enabling said plurality of compact disk control switches in one of said positions and mutually exclusively enabling the system responsive to said selection code signal established by said keyboard means in the other of said positons; and,
   (c) memory means for transmitting to said microprocessor one of a multiplicity of predetermined control code signals responsive to said selection code signal from said keyboard means.

2. The compact digital disk system as recited in claim 1 where said keyboard means includes a key panel having a multiplicity of switch elements for establishing a contact closure responsive to said manual input.

3. The compact digital disk system as recited in claim 2 where said keyboard means includes a decoder/driver coupled to said key panel for establishing said selection code responsive to said contact closure.

4. The compact digital disk system as recited in claim 3 where said multiplicity of switch elements of said key panel are arranged in rows and columns to form a matrix, said matrix coupled to said decoder/driver for receiving a pulse sequentially input to each of said rows and transmitting a pulse to a column output responsive to said contact closure.

5. The compact digital disk system as recited in claim 4 where said key panel includes a graphic overlay adapted for releasable coupling to said key panel for identifying each of said multiplicity of switch elements with respect to said teaching function.

6. The compact digital disk system as recited in claim 5 where said decoder/driver includes an interrupt generator coupled to said microprocessor for establishing an interrupt signal responsive to said contact closure for indicating said manual input to said microprocessor.

7. The compact digital disk system as recited in claim 1 where said memory means includes a non-volatile memory device coupled to said microprocessor for (1) storage of said multiplicity of predetermined control code signals, and (2) transmission to said microprocessor one of said predetermined control code signals responsive to said selection code signal and a track encoder enable signal, said selection code signal defining a predetermined memory storage location within said non-volatile memory device.

8. The compact digital disk system as recited in claim 7 where said memory means further includes an address decoder coupled to said microprocessor and said non-volatile memory for establishing said track encoder enable signal responsive to an address signal from said microprocessor.

9. An interactive compact disk system having a teaching mode and an entertainment mode, where said teaching mode provides a means for recovery of a predetermined aural response from non-sequential discrete storage locations on a compact digital disk, said compact disk system having a plurality of control switches for use in said entertainment mode, comprising:
   (a) interface means for (1) converting a mechanical input to a digital code, and (2) establishing an interrupt signal responsive to said mechanical input for initiating the temporary storage of said digital code, said digital code being representative of said discrete storage location on said disk;
   (b) microprocessor means for (1) establishing a multiplicity of signals to control said compact disk system, at least one of said multiplicity of control signals being a track selection signal defining said storage location on said disk, and (2) establishing an encoder address responsive to said digital code when said microprocessor is operating in said teaching mode;
   (c) mode control means for selecting between said teaching mode and said entertainment mode, said teaching mode selection enabling said response by said microprocessor means to said digital code from said interface means, said entertainment mode enabling said plurality of control switches, said mode control means including (1) a mode select switch having two positions, each of said two positions representing one of said mutually exclusive modes, and (2) a mode select interface coupled to said mode select switch and said microprocessor; and,
   (d) memory means for providing a predetemined control code signal responsive to said encoder address generated by said microprocessor means, said control code signal defining said tract selection signal.

10. The interactive system as recited in claim 9 where said interface means includes (1) a keyboard for converting said mechanical input to an electrical signal, (2) a decoder/driver coupled to said keyboard for converting said electrical signal to said digital code and establishing a key stroke signal, and, (3) an interrupt generator coupled to said decoder/driver for establishing said interrupt signal responsive to said key stroke signal.

11. The interactive system as recited in claim 10 where said keyboard includes a graphic overlay for directing said mechanical input, said graphic overlay being releasably coupled to said keyboard.

12. The interactive system as recited in claim 11 where said keyboard has a matrix configuration.

13. The interactive system as recited in claim 9 where said mode select interface establishes a mode select signal responsive to said mode select switch position for transmission to said microprocessor.

14. The interactive system as recited in claim 13 where said mode select switch is a single pole, double throw switch element.

15. The interactive system as recited in claim 9 where said memory means is a read only type memory for providing a look-up table for said predetermined control code responsive to said encoder address.

16. The interactive system as recited in claim 15 where said microprocessor means transmits said track control signal responsive to said predetermined control code signal from said look-up table for said recovery of said predetermined aural response.

17. The interactive system as recited in claim 16 where said microprocessor means is a MC68000 series microprocessor.

* * * * *